United States Patent [19]

Katto et al.

[11] Patent Number: 4,748,205

[45] Date of Patent: May 31, 1988

[54] THERMOPLASTIC RESIN COMPOSITION

[75] Inventors: Takayuki Katto; Yasumasa Komatsu; Zenya Shiiki, all of Fukushima, Japan

[73] Assignee: Kureha Kagaku Kogyo Kabushiki Kaisha, Tokyo, Japan

[21] Appl. No.: 62,694

[22] Filed: Jun. 16, 1987

Related U.S. Application Data

[60] Division of Ser. No. 834,122, Feb. 26, 1986, Pat. No. 4,701,495, which is a continuation of Ser. No. 618,663, Jun. 8, 1984, abandoned.

[30] Foreign Application Priority Data

Jun. 10, 1983 [JP]  Japan ................................. 58-103919

[51] Int. Cl.$^4$ ...................... C08L 33/04; C08L 51/00
[52] U.S. Cl. ........................................ 525/75; 525/84; 525/85
[58] Field of Search ....................................... 525/75, 85

[56] References Cited

U.S. PATENT DOCUMENTS 4,337,324   6/1982   Yusa et al. ............................ 525/75

Primary Examiner—Jacob Ziegler
Attorney, Agent, or Firm—Cushman, Darby & Cushman

[57]          ABSTRACT

A thermoplastic resin composition of high heat resistance and high impact resistance is described, comprising: (A) 50 to 90% by weight of a copolymer prepared by copolymerization of 10 to 35% by weight of acrylonitrile, 60 to 85% by weight of a monomer mixture of 2-isopropenylnaphthalene (2-IPN) and α-methylstyrene (α-MeSt), the proportion of 2-IPN being 5 to 70% by weight based on the total weight of 2-IPN and α-MeSt, and 0 to less than 10% by weight of a vinyl monomer copolymerizable with the foregoing monomers; and (B) 10 to 50% by weight of a graft copolymer prepared by polymerizing 15 to 50 parts by weight of at least one monomer selected from the group consisting of aromatic vinyl compounds, vinyl cyanides, methacrylic acid alkyl esters, and acrylic acid alkyl esters in the presence of 50 to 85 parts by weight of a butadiene- or alkyl acrylate-based rubber, the sum of the graft and rubber components being 100 parts by weight.

10 Claims, No Drawings

THERMOPLASTIC RESIN COMPOSITION

RELATED APPLICATIONS

This application s a divisional application of U.S. application Ser. No. 834,122 filed on Feb. 26, 1986, now U.S. Pat. No. 4,701,495 which in turn is a continuation application of U.S. application Ser. No. 618,663 filed June 8, 1984, now abandoned.

FIELD OF THE INVENTION

The present invention relates to a novel thermoplastic resin composition having superior heat resistance and impact resistance.

BACKGROUND OF THE INVENTION

A rubber/an acrylonitrile-styrene copolymer composition (hereinafter sometimes referred to as "ABS resin") is widely used because of its good workability and superior impact resistance. This ABS resin, however, has a disadvantage of being poor in heat resistance which is usually expressed in terms of a heat distortion temperature. In order to overcome the foregoing problem, various methods have been proposed, including:

(1) a method of substituting $\alpha$-methylstyrene (hereinafter sometimes abbreviated to "$\alpha$-MeSt") for styrene (hereinafter sometimes abbreviated to "St") of the components to be grafted onto rubber, i.e., St. and acrylonitrile (hereinafter sometimes abbreviated to "AN"); see U.S. Pat. No. 2,908,661;

(2) a method of blending an $\alpha$-MeSt/AN copolymer with an ABS resin; see Japanese Patent Publication No. 18194/60;

(3) a two-stage grafting method in which St and AN are first grafted onto rubber and then $\alpha$-MeSt and AN are grafted thereonto; see Japanese Patent Publication No. 13616/67;

(4) a method of blending an $\alpha$-MeSt-methyl methacrylate (hereinafter sometimes abbreviated to "MMA")-AN copolymer to an ABS resin; see Japanese Patent Publication Nos. 18016/70, 33304/70 and 15902/69; and (5) a composition comprising an $\alpha$-MeSt-MMA-AN copolymer and a graft copolymer prepared by graft-polymerization of MMA, St and AN onto rubber; see Japanese Patent Publication No. 37415/71.

Substitution of $\alpha$-MeSt and MMA for conventional resin components enables the artisan to increase heat resistance to a certain extent but not to a sufficient level. Thus, the resulting resin compositions are limited in their use. For this reason, it has been desired to develop an ABS resin having a more improved heat resistance.

SUMMARY OF THE INVENTION

An object of the present invention is to provide a thermoplastic resin composition which has superior heat resistance that could not be expected for conventional heat resistant or super heat resistant ABS resins and, furthermore, which is superior in impact resistance and workability.

It has been found according to the present invention that composition comprising: (A) a 2-isopropenylnaphthalene (hereinafter sometimes abbreviated to "2-IPN")-$\alpha$-MeSt-AN copolymer; and (B) a graft copolymer as an impact strength-increasing agent which is prepared by graft-polymerizing a monomer mixture of one or more of aromatic vinyl compounds, vinyl cyanide, methacrylic acid alkyl esters, and acrylic acid alkyl esters onto a diene-based rubber or alkyl acrylate-based rubber possesses superior heat resistance and impact resistance.

The present invention relates to a thermoplastic resin composition comprising:

50 to 90% by weight of a copolymer (A) prepared by copolymerization of 10 to 35% by weight of acrylonitrile, 60 to 85% by weight of a monomer mixture consisting of 2-isopropenylnaphthalene and $\alpha$-methylstyrene, the proportion of 2-isopropenylnaphthalene being 5 to 70% by weight based on the total weight of 2-isopropenylnaphthalene and $\alpha$-methylstyrene, and 0 to less than 10% by weight of a vinyl monomer copolymerizable with the foregoing monomers; and 10 to 50% by weight of a graft copolymer (B) prepared by polymerizing 15 to 50 parts by weight of at least one monomer selected from the group consisting of aromatic vinyl compounds, vinyl cyanide, methacrylic alkyl esters, and acrylic alkyl esters in the presence of 50 to 85 parts by weight of a butadiene-based rubber or alkyl acrylate-based rubber, the sum of the rubber and graft components being 100 parts by weight.

DETAILED DESCRIPTION OF THE INVENTION

One of the features of the present invention is to provide a thermoplastic resin composition having superior heat resistance. Since the thermoplastic resin composition of the present invention is composed mainly of the copolymer (A) containing 2-IPN, i.e., a 2-IPN-MeSt-AN copolymer exhibits a considerably increased heat resistance than conventional copolymer compositions not containing 2-IPN, such as $\alpha$-MeSt-An and $\alpha$-MeSt-St-AN. Thus, it can be seen that the effect of the 2-IPN component on the heat resistance of the composition is surprisingly significant.

Another feature of the present invention is that the thermoplastic resin composition of the present invention has superior impact resistance. 2-IPN-containing copolymers per se are superior in heat resistance but are poor in impact strength and, thus, are of little practical value. Addition, however, of the graft copolymer (B) as an impact strength-increasing agent of the copolymer (A), the graft copolymer (B) being prepared by adding a monomer mixture of one or more of aromatic vinyl compounds, vinyl cyanide, methacrylic acid alkyl esters, and acrylic acid alkyl esters, to a butadiene-based rubber or alkyl acrylate-based rubber latex having a large mean particle size and then polymerizing the resulting mixture, results in the formation of a composition having superior impact resistance.

Still another feature of the present invention is that the melt viscosity of the composition can be easily controlled, for example, by adjusting the degree of polymerization of the copolymer (A) by the use of a chain transfer agent.

The present invention will hereinafter be explained in detail. First, the copolymer (A) of 2-IPN, $\alpha$-MeSt and AN, which is a main component of the thermoplastic resin composition of the present invention, is described. The copolymer (A) endows the composition with physical properties such as heat resistance, hardness and tensile strength. As a practical matter, of course, these physical properties vary depending on the monomer composition of the copolymer (A).

2-IPN is an important component that among the above-described three components, most greatly contributes to heat resistance. $\alpha$-Methylstyrene is also a component contributing to heat resistance. Although the total amount of 2-IPN and α-methylstyrene is desired to be as large as possible in increasing the heat resistance of the composition, if the content is too large, the yield in the copolymerization will drop. The proportion of the sum of the 2-IPN and α-MeSt in the monomer mixture is from 60 to 85% by weight and preferably from 65 to 80% by weight. If the proportion is less than 60% by weight, heat resistance cannot be increased, whereas if it is in excess of 85% by weight, the yield undesirably decreases. 2-IPN, when used in combination with α-MeSt, can provide higher heat resistance than α-MeSt alone. The proportion of 2-IPN is from 5 to 70% by weight, preferably from 10 to 60% by weight, based on the total weight of 2-IPN and α-MeSt. If the proportion of 2-IPN is less than 5% by weight, the desired high heat resistance cannot be obtained, whereas if it is in excess of 705 by weight polymerizability is somewhat reduced.

In the preparation of the copolymer (A), it is preferred to employ an emulsion polymerization method in order that the amounts of 2-IPN and α-MeSt contributing to heat resistance are increased as much as possible and, furthermore, the rate of polymerization and yield are increased. Acrylonitrile has the effects of increasing the polymerizability of the monomer mixture in the emulsion polymerization and, furthermore, of increasing the impact strength and resistance to thermal decomposition of the copolymer (A). However, when used in large amounts, acrylonitrile causes a reduction in heat resistance. Acrylonitrile, therefore, is used in a proportion of from 10 to 35% by weight and preferably from 15 to 30% by weight.

Vinyl monomers copolymerizable with the above-described monomers include styrene, methyl methacrylate methacrylonitrile, methacrylic acid, and acrylic acid, etc. This vinyl monomer can be used in small amounts if necessary to improve a rate of polymerization and to provide other properties. Usually it is used in an amount of 0 to less than 10% by weight.

In the preparation of the copolymer (A), as described above, it is most preferred to employ emulsion polymerization. This emulsion polymerization can be performed by known procedures using peroxides, emulsifying agents, polymerization accelerators, and so forth. The emulsion polymerization process may be performed in any suitable manner. For example, the monomer mixture is added at the same time to the reaction system and polymerized, or the monomer mixture is divided and added in several portions, or one or more monomer mixtures are continuously introduced into the reaction system and polymerized. For this purpose of adjusting the degree of polymerization (molecular weight) of the copolymer (A), a chain transfer agent, such as mercaptans, can be used.

The graft copolymer (B), which is the other component of the thermoplastic resin composition of the present invention and is added as an impact strength-increasing agent, is prepared by adding 15 to 50 parts by weight of a monomer mixture of one or more of aromatic vinyl compounds, vinyl cyanide, methacrylic acid alkyl esters, and acrylic acid alkyl esters to 50 to 85 parts by weight of a butadiene-based rubber or alkyl acrylate-based rubber and then polymerizing the monomer mixture in the presence of the butadiene-based rubber or alkyl acrylate-based rubber. The butadiene-based rubber or alkyl acrylate-based rubber may contain small amounts of cross-linking agents and chain transfer agents. At the time of graft polymerization, small amount of crosslinking agents or chain transfer agents may be incorporated.

Aromatic vinyl compounds which can be used as the graft component for the graft polymer (B) of the present invention include styrene, α-methylstyrene, chlorostyrene, tert-butylstyrene, and p-methylstyrene. Of these compounds, styrene is most preferred. As the vinyl cyanide, acrylonitrile is most preferred. In addition, methacrylonitrile can be used. Preferred examples of methacrylic acid alkyl esters are those compounds in which the alkyl group has from 1 to 4 carbon atoms, such as MMA, n-butyl methacrylate and ethyl methacrylate. Preferred examples of acrylic acid alkyl esters are those compounds in which the alkyl group has from 1 to 8 carbon atoms, such as methyl acrylate, ethyl acrylate, and butyl acrylate.

The graft component as used herein is at least one monomer selected from the group consisting of the above-described aromatic vinyl compounds, vinyl cyanides, methacrylic acid alkyl esters and acrylic acid alkyl esters. In order to increase the effect to impart high impact resistance, the graft component preferably comprises 0 to 100% by weight of a methacrylic acid alkyl ester and/or an acrylic acid alkyl ester, 0 to 85% by weight of an aromatic vinyl compound, and 0 to 40% by weight of a vinyl cyanide. Typical examples are a styrene-acrylonitrile mixture, methyl methacrylate alone, a methyl methacrylate-styrene mixture, and a methyl methacrylate-styrene-acrylonitrile mixture.

The butadiene-based rubber to be used as the rubber component for the graft copolymer (B) is polybutadiene or a butadiene copolymer prepared from a major proportion of butadiene and one or more vinyl monomers copolymerizable with butadiene. Similarly, the alkyl acrylate-based rubber is a polyalkyl acrylate or an alkyl acrylate copolymer prepared from a major proportion of alkyl acrylate and one or more monomers copolymerizable with alkyl acrylate. Preferred examples of alkyl acrylate are those compounds in which the alkyl group has from 4 to 8 carbon atoms, such as butyl acrylate and octyl acrylate.

Cross-linking agents which can be used in the polymerization of the rubber or graft component are those compounds copolymerizable with butadiene or alkyl acrylates. Examples are divinylbenzene, ethylene glycol dimethacrylate, diethylene glycol dimethacrylate, triethylene glycol dimethacrylate, tetraethylene glycol dimethacrylate, ethylene glycol diacrylate, diethylene glycol diacrylate, triethylene glycol diacrylate, trimethyolpropane trimethacrylate or acrylate, 1,3-butanediol dimethacrylate, and 1,3-butanediol diacrylate.

As chain transfer agents, known compounds such as n-octylmercaptan, n-dodecylmercaptan, and tert-dodecylmercaptan can be used.

The graft copolymer (B) can be prepared by polymerization procedures that are commonly used. Especially preferred is an emulsion polymerization method. To more improve the impact resistance of the composition, it is preferred to use a rubber latex having a means particle size of at least 1,500 Å. This rubber latex can be prepared by known emulsion polymerization procedures. Such large particle sized rubber latexes can be prepared by known techniques such as a multi-stage seed polymerization method and a microcoagulation method in which small particle sized rubber latexes are coagulated with additives such as acids, salts, and water-soluble polymers. The micro-coagulation method is simpler in operation to conduct. Microcoagulation can be carried out by known procedures using inorganic acids such as hydrochloric acid, organic acids such as tartaric acid, malic acid and acetic acid, water-soluble polymers such as polyethylene oxide and polyvinyl alcohol, salt, metal salts such as magnesium chloride, combinations of peroxides and formaldehydesulfoxylic acid salts, and the like.

With regard to the ratio of the rubber component to the graft component, the graft copolymer (3) is prepared from 50 to 85 parts by weight of the rubber component and 15 to 50 parts by weight of the graft component (the sum of the rubber and graft components is 100 parts by weight) in order to increase the effect of imparting impact resistance and further to facilitate post-treatments such as salting and drying. Graft polymerization may be performed in either one stage or more stages. Moreover, it may be performed while continuously feeding the monomer mixture.

Physical properties such as heat resistance and impact resistance of the thermoplastic resin composition of the present invention vary significantly depending on the composition of each of the copolymer (A) and the graft copolymer (B) and further on the ratio of the copolymer (A) to the graft copolymer (B). In order that the physical properties are well balanced, the thermoplastic resin composition of the present invention is formulated to be composed of 50 to 90% by weight of the copolymer (A) and 10 to 50% by weight of the graft copolymer (B).

The copolymer (A) and the graft copolymer (B) can be mixed by known procedures. For example, the copolymer (A) and the graft copolymer (B) are powdered or pelletized and are mixed by the use of rolls, screws, kneaders, Banbury mixers, and so forth. In addition, a method can be used in which the latexes of the copolymer (A) and the graft copolymer (B) are mixed and then salted out.

If desired, after the copolymer (A) and the graft copolymer (B) are mixed, additives conventionally used in such compositions, such as antioxidants, stabilizers, fillers, pigments, and plasticizers, can be added to the resulting resin composition.

The thermoplastic resin composition of the present invention is superior in heat resistance, impact resistance, mechanical characteristics and workability and, therefore, is useful as a material for use in injection molding and extrusion molding.

The following Examples and Comparative Examples are given to illustrate the present invention in greater detail. In these Examples, the solution viscosity ($\eta_{sp/c}$) was measured under conditions of solvent chloroform, concentration 4 g/l, and temperature 30° C. The glass transition temperature (Tg) was measured in a nitrogen ($N_2$) atmosphere at a rate of elevation of temperature of 10° C./min by the use of a differential scanning calorimeter (DSC) produced by Rigaku Denki Co., Ltd. The latex particle size was measured by the use of Coulter Nano-sizer produced by Coulter Electronics, Ltd. All percents and parts are by weight and temperatures in degrees centigrade unless otherwise indicated.

EXAMPLES 1 TO 8 AND COMPARATIVE EXAMPLES 1 TO 5

Preparation of Copolymers A-1 to A-6

A polymerization reactor was charged with compounds as shown below and, after replacement of the atmosphere with $N_2$, they were heated to 60° C. in a stream of $N_2$.

| Component | Amount (parts) |
| --- | --- |
| $H_2O$ | 250 |
| Sodium Formaldehydesulfoxylate | 0.4 |
| Sodium Dodecylbenzenesulfonate | 1.5 |
| Ferrous Sulfate | 0.0025 |
| Disodium Ethylenediaminetetraacetate | 0.01 |

Monomer mixture as shown in Table 1 were each continuously introduced into the polymerization reactor over 6 hours. After the addition was completed, the resulting mixture was further stirred at 60° C. for 1 hour.

Each latex as prepared above was salted out with aluminum sulfate, neutralized, washed with water, filtered off, and extracted with methanol to remove the remaining monomers. The thus-prepared copolymer was measured for yield, glass transition temperature, and solution viscosity. The results are shown also in Table 1. Copolymers A-5 and A-6 are comparative copolymers not containing 2-IPN. It can be seen from Table 1 that when 2-IPN is used as a copolymer component, the glass transition temperature of the resulting copolymer (A) is greatly increased.

TABLE 1

| Copolymer (A) | Composition of Monomer Mixture | | | | | Yield (%) | Tg (°C.) | $\eta_{sp/c}$ (dl/g) | Remarks |
| --- | --- | --- | --- | --- | --- | --- | --- | --- | --- |
| | α-MeSt | 2-IPN | AN | MMA | t-DM[*2] | | | | |
| A-1 | 55 | 15 (21.4)[*1] | 30 | — | 0.1 | 95 | 140 | 0.74 | CHP[*3] 0.4 |
| A-2 | 65 | 10 (13.3) | 25 | — | 0.2 | 88 | 144 | 0.71 | " |
| A-3 | 55 | 20 (26.7) | 25 | — | 0.1 | 87 | 148 | 0.64 | " |
| A-4 | 62.5 | 11 (15.0) | 17.5 | 9 | 0.15 | 91 | 146 | 0.59 | " |
| A-5+ | 70 | 0 (0) | 30 | — | 0.3 | 94 | 133 | 0.82 | " |
| A-6+ | 75 | 0 (0) | 25 | — | 0.3 | 88 | 138 | 0.77 | " |

[*1]The figures in parentheses indicate the percent of 2-IPN based on the total weight of α-MeSt and 2-IPN.
[*2]t-DM: Tert-dodecylmercaptan
[*3]CHP: Cumene hydroperoxide (polymerization catalyst)
+Comparative, not according to the invention.

Preparation of Copolymers A-7 and A-8

A polymerization reactor was charged with an aqueous solution containing the same polymerization aids as used in the preparation of Copolymers A-1 to A-6. After replacement of the atmosphere with $N_2$, the contents were heated to 60° C. in a stream of $N_2$. A monomer mixture (a) as shown in Table 2 was introduced into the polymerization reactor and thoroughly emulsified. Then, a monomer mixture (b) as shown in Table 2 was continuously introduced over 6 hours. After the addition was completed, the mixture was further stirred at 60° C. for 1 hour. The thus-prepared latex was subjected to the same post-treatment as in the preparation of Copolymers A-1 to A-6.

The thus-prepared copolymer was measured for the yield, glass transition temperature, and solution viscosity. The results are shown in Table 2.

TABLE 2

|  | Copolymer | |
| --- | --- | --- |
|  | A-7 | A-8 |
| Monomer Mixture (a) | | |
| α-MeSt | 62.5 | 75 |
| 2-IPN | 12.5 (16.6) | 0 |
| TDM | 0.2 | 0.2 |
| Monomer Mixture (b) | | |
| AN | 25 | 25 |
| CHP | 0.5 | 0.5 |
| TDM | 0.17 | 0.2 |
| Yield (%) | 91 | 92 |
| Tg (°C.) | 145 | 139 |
| $\eta_{sp/c}$ (dl/g) | 0.70 | 0.79 |

It can be seen from Table 2 that when a small amount of 2-IPN is copolymerized, the glass transition temperature (Tg) of the resulting copolymer is increased.

Preparation of Graft Copolymers B-1 and B-2

The Graft Copolymer B-1 was prepared as follows: The following compounds were placed in a polymerization reactor and polymerized at 60° C. for 10 hours.

|  | Amount (parts) |
| --- | --- |
| Water | 170 |
| FeSO$_4$.7H$_2$O | 0.00195 |
| EDTA.Na | 0.00325 |
| Sodium Pyrophosphate | 0.1085 |
| Sodium Formaldehydesulfoxylate (SFS) | 0.03 |
| Potassium Oleate (OLK) | 0.9 |
| Butadiene (Bu) | 55 |
| Styrene (St) | 10 |
| TDM | 0.195 |
| CHP | 0.12 |

The above-prepared rubber latex had a particle size of 820 Å.

The temperature of 236.3 parts of the rubber latex (rubber content: 65 parts) was raised to 60° C., and 5 parts of 8.8% aqueous solution of SFS and 0.65 parts of a 355% aqueous solution of hydrogen peroxide were added thereto. The resulting mixture was stirred for 5 minutes and then stirring was stopped. After 2.5 hours, 9 parts of a 3% aqueous solution of NaOH, 0.5 part of OLK and 100 parts of H$_2$O were added, and the pH was 11.5. The latex rubber particle size as determined by the Nano-sizer was 2,600 Å.

To the micro-coagulated rubber latex were added 12.25 parts of methyl methacrylate (MMA), 5.25 parts of St, 0.088 parts of TDM, 0.06 part of CHP, 0.15 part of SFS, and 1 part of H$_2$O, which were then polymerized at 60° C. for 4 hours. In addition, 12.25 parts of MMA, 5.25 parts of St, 0.088 of TDM, 0.06 part of CHP, 0.03 part of SFS, and 0.2 part of H$_2$O were added to the rubber latex, and polymerization was continued at 60° C. for 7 hours. Three hours after the start of the polymerization, 0.03 part of SFS and 0.2 part of H$_2$O were added.

A small amount of phenol-based antioxidant was added. On adding hydrochloric acid, precipitation occurred, yielding an MMA-St-Bu Graft Copolymer B-1. Tye yield was 99%.

The Graft Copolymer B-2 was prepared as follows: To the same micro-coagulated rubber latex as used in the preparation of the Graft Copolymer B-1 in the amount of rubber content 65 parts were added 0.065 part of dioctyl sodium sulfosuccinate, 12.25 parts of MMA, 5.25 parts of St, 0.088 part of TDM, 0.06 part of CHP, 0.15 part of SFS, and 1 part of H$_2$O, which were then polymerized at 60° C. for 6 hours.

In addition, 13.1 parts of St, 4.4 parts of AN, 0.088 parts of TDM, 0.06 part of CHP, 0.03 part of SFS, and 1 part of H$_2$O were added to the latex, and polymerization was continued at 60° C. for 7 hours. Three hours after the start of the polymerization, 0.03 part of SFS and 1 part of H$_2$O were added.

The same post-treatment as in the preparation of the Graft Copolymer B-1 was applied, yielding an AN-MMA-St-Bu graft copolymer (Graft Copolymer B-2). The yield was 98.5%.

Physical Properties of the Resin Compositions

Resin compositions of 69.2 parts of Copolymer (A) and 30.8 parts of Graft Copolymer (B) as shown in Table 3 were each roll-kneaded at 200° C. for 3 minutes and then press-molded at 220° C. Each mold was measured for Izod impact strength (according to ASTM-256; thickness: 6mm; V notch: R=0.25 mm), Vicat softening temperature (according to ASTM D-1525; load: 1 kg), and melt viscosity (using a Koka type flow tester; temperature: 260° C.; load: 100 kg; nozzle: 1.0 mm (diameter)×10 mm (length)). The results are shown in Table 3.

TABLE 3

| Run No. | Copolymer (A) | Graft Copolymer (B) | Izod Impact Strength (23° C.) (kg-cm/cm) | Vicat Softening Temperature (°C.) | Melt Viscosity (poises) |
| --- | --- | --- | --- | --- | --- |
| Example 1 | A-1 | B-2 | 13 | 141 | — |
| Example 2 | A-2 | B-1 | 8 | 143 | 9.4 × 10$^3$ |
| Example 3 | A-2 | B-2 | 16 | 143.5 | — |
| Example 4 | A-3 | B-2 | 11 | 146.5 | — |
| Example 5 | A-4 | B-1 | 8 | 147 | 7.0 × 10$^3$ |
| Example 6 | A-4 | B-2 | 11 | 147.5 | — |
| Comparative Example 1 | A-5 | B-2 | 24 | 132.5 | — |
| Comparative Example 2 | A-6 | B-1 | 11 | 135.5 | 6.8 × 10$^3$ |
| Comparative Example 3 | A-6 | B-2 | 22 | 136 | — |
| Example 7 | A-7 | B-1 | 11 | 145 | 11 × 10$^3$ |
| Example 8 | A-7 | B-2 | 16 | 145.5 | — |
| Comparative Example 4 | A-8 | B-1 | 18 | 139 | 10 × 10$^3$ |
| Comparative Example 5 | A-8 | B-2 | 19 | 139 | — |

It can be seen from Table 3 that the compositions prepared using the matrix copolymers containing 2-IPN are superior in heat resistance to the compositions using the matrix copolymers not containing 2-IPN.

EXAMPLES 9 AND 10

Preparation of Copolymer A-9

The same procedures as used in the preparation of the Copolymers A-7 and A-8 were repeated wherein 70 parts of α-MeSt, 10 parts of 2-IPN, and 0.1 part of TDM were charged and fully emulsified and, thereafter, 20 parts of AN, 0.5 part of CHP and 0.1 part of TDM were continuously added over 6 hours, whereupon Copolymer A-9 was prepared.

For the Copolymer A-9, the yield was 90%, the glass transition temperature (Tg) was 145° C., and the solution viscosity ($\eta_{sp/c}$) was 0.71 dl/g.

Copolymer A-9 and the Graft Copolymer B-2 were compounded in the ratio shown in Table 4, roll-kneaded at 200° C. and then press-molded at 220° C. This mold was measured for the same physical properties as in Examples 1 to 8. The results are shown in Table 4.

TABLE 4

| Run No. | Copolymer (A) (parts) | Graft Copolymer (B) (parts) | Izod Impact Strength (notched, 23° C.) (kg-cm/cm) | Vicat Softening Temperature (°C.) |
|---|---|---|---|---|
| Example 9 | 69.2 | 30.8 | 14 | 144.5 |
| Example 10 | 76.9 | 23.1 | 10 | 146 |

EXAMPLE 11

Preparation of Graft Copolymer B-3

The following compounds were placed in a polymerization reactor and polymerized at 60° C. for 9 hours.

| | Amount (parts) |
|---|---|
| Water | 170 |
| FeSO$_4$.7H$_2$O | 0.00195 |
| EDTA.Na | 0.00325 |
| Sodium Pyrophosphate | 0.1085 |
| SFS | 0.03 |
| OLK | 0.9 |
| Butyl Acrylate | 70 |
| Ethylene Glycol Dimethacrylate (EDMA) | 0.75 |
| Diisopropylbenzene Hydroperoxide (HPO) | 0.12 |

The resulting rubber latex was micro-coagulated at 60° C. with an aqueous hydrochloric acid solution to prepare a rubber latex having a particle size (as determined by the use of the Nano-sizer) of 2,200 Å.

To the thus-micro-coagulated rubber latex were added 3.75 parts of MMA, 8.25 parts of St, 3 parts of AN, 0.03 part of EDMA, 0.06 part of HPO, 0.03 part of SFS, and 1 part of H$_2$O which were then polymerized at 60° C. for 4 hours. In addition, 13.5 parts of MMA, 1.5 parts of St, 0.02 part of EDMA, 0.03 part of HPO, 0.015 part of SFS, and 1 part of H$_2$O were added to the latex, and polymerization was continued at 60° C. for 6 hours.

On applying acid-precipitation followed by drying and alkyl acrylate-based rubber-containing graft copolymer was obtained.

The Copolymer A-9 and the Graft Copolymer B-3 were compounded in a ratio of A-9/B-3=65/35, and then roll-kneaded and press-molded in the same manner as in Examples 1 to 8. This mold was measured for the physical properties. The Izod impact strength (notched, 23° C.) was 6 kg-cm/cm and the Vicat softening temperature was 142° C.

While the invention has been described in detail and with reference to specific embodiments thereof, it will be apparent to one skilled in the art that various changes and modifications can be made therein without departing from the spirit and scope thereof.

What is claimed is:

1. A thermoplastic resin composition exhibiting improved heat resistance and high impact resistance, comprising:
   50% to 90% by weight of a copolymer (A) prepared by copolymerizing of 10 to 35% by weight of acrylonitrile, 60 to 85% by weight of a monomer mixture consisting of 2-Isopropenylnaphthalene and α-methylstyrene, the proportion of 2-isopropenylnaphthalene being 5% to 70% by weight based on the total of 2-isoprophenyl- naphthalene and α-methylstyrene, and 0 to less than 10% by weight of a vinyl monomer copolymerizable with the foregoing monomers; and
   10 to 50% by weight of a graft copolymer (B) prepared by adding 15 to 50 parts by weight of at least one monomer selected from the group consisting of aromatic vinyl compounds, vinyl cyanides, methacrylic acid alkyl esters, and acrylic acid alkyl esters to 50 to 85 parts by weight of an alkyl acrylate-containing rubber, the sum of the rubber component and the graft component being 100 parts by weight, and polymerizing the graft copolymer in the presence of the rubber component.

2. The thermoplastic resin composition of claim 1, in which the total monomer mixture of copolymer (A) contains from 65 to 80% by weight of 2-isopropenylnaphthalene and α-methylstyrene.

3. The thermoplastic resin composition of claim 1, in which the proportion of 2-isopropenylnaphthalene is from 10 to 60% by weight based on the total weight of 2-isopropenylnaphthalene and α-methylstyrene.

4. The thermoplastic resin composition of claim 1, in which the total monomer mixture of copolymer (A) contains from 15 to 30% by weight acrylonitrile.

5. The thermoplastic resin composition of claim 1, in which copolymer (A) contains at least one of styrene, methyl methacrylate, methacrylonitrile, methacrylic acid or acrylic acid as the vinyl monomer component.

6. The thermoplastic resin composition of claim 1, in which the methacrylic acid alkyl esters in the graft component of a graft copolymer (B) have an alkyl group containing 1 to 4 carbon atoms.

7. The thermoplastic resin composition of claim 1, in which the acrylic acid alkyl esters in the graft component of a graft copolymer (B) has an alkyl group containing 1 to 8 carbon atoms.

8. The thermoplastic resin composition of claim 1, in which the graft component of graft copolymer (B) contains:
   0 to 100% by weight of a methacrylic acid alkyl ester, an acrylic acid alkyl ester or mixtures thereof;
   0 to 85% by weight of an aromatic vinyl compound; and
   0 to 40% by weight of a vinyl cyanide.

9. The thermoplastic resin composition of claim 1, in which the rubber component of graft copolymer (B) is a polyalkyl acrylate or an alkyl acrylate copolymer containing a major proportion of an alkyl acrylate and the balance at least one monomer copolymerizable therewith, provided that the alkyl group of the alkyl acrylate employed contains from 4 to 8 carbon atoms.

10. A molded article of the thermoplastic resin composition of claim 1.

* * * * *